United States Patent [19]

Huang

[11] Patent Number: 4,989,891
[45] Date of Patent: Feb. 5, 1991

[54] REMOVABLE SAFETY BAR FOR A BABY STROLLER

[76] Inventor: Ming-Tai Huang, 4 Fl., No. 302, Pai Ling Wu Rd., Taipei, Taiwan

[21] Appl. No.: 508,847

[22] Filed: Apr. 12, 1990

[51] Int. Cl.⁵ ............................................. B62B 7/14
[52] U.S. Cl. .............................. 280/47.38; 297/487; 297/488; 403/327
[58] Field of Search ................... 280/47.38, 642, 644, 280/650, 658; 297/487, 488; 403/327, 329, 330, 379; 211/105.6; 410/147, 148

[56]  References Cited

U.S. PATENT DOCUMENTS

| | | | |
|---|---|---|---|
| 2,988,135 | 6/1961 | Caminiti | 211/105.6 X |
| 3,619,005 | 11/1971 | Hardy | 297/488 |
| 3,713,695 | 1/1973 | von Wimmersperg | 297/487 X |
| 4,679,806 | 7/1987 | Gingline | 297/488 X |

Primary Examiner—Richard A. Bertsch
Assistant Examiner—Martin W. Gerich
Attorney, Agent, or Firm—Renner, Otto, Boisselle & Sklar

[57] ABSTRACT

A removable safety bar for a baby stroller is at both ends securable within each of both arms of a baby stroller. A hollow plastic arm of a baby stroller is provided with a hole formed with an inner flange. The removable safety bar includes a shaft covered with a foam rubber sleeve. To each end of the shaft is fitted and engaging means which secures within each of both arms of the baby stroller by means of an engaging piece which securely hooks over the inner flange formed in each arm and which is easily unhookable by a slight pressure applied to the engaging means with the fingers. During removal, the engaging means is slid back along the shaft until the notch is disengaged from the arm. A spring provided at the butt end of the shaft within the engaging piece provides a restorative force which causes the engaging means, upon removal, to slide back to its original position.

1 Claim, 4 Drawing Sheets

REMOVABLE SAFETY BAR FOR A BABY STROLLER

BACKGROUND OF THE INVENTION

This invention relates to a baby stroller, and, more particularly, to a removable safety bar for a baby stroller.

A conventional baby stroller includes a safety bar either end of which is attached to the end of each of both arms. The legs of a child, placed feet first into a baby stroller, slide under the safety bar. Often a slat, attached at one end under the seat and attached at the other end to the safety bar, prevents the child from completely sliding out of the stroller from under the the safety bar. Support is thereby provided at the crotch with the child placed feet first in the stroller—one foot through the space to the right of the slat and the other to the left.

Unfortunately, as the child gets bigger, or when the child is all bundled up in winter clothing, it becomes more difficult to guide the child's legs through the space between the safety bar and the seat when placing the child in the stroller. The present invention therefore seeks to mitigate and/or obviate this disadvantage by providing a removable safety bar for a baby stroller.

SUMMARY OF THE INVENTION

It is accordingly a primary objective of the present invention to provide a removable safety bar for a baby stroller.

It is a further objective to provide a removable safety bar for a baby stroller which by means of uniquely designed engaging means conveniently and securely engages with each of both arms of a baby stroller.

It is a further objective to provide a removable safety bar which by means of the same aforementioned engaging means conveniently disengages with the arms of the baby stroller.

It is a further objective to provide a removable safety bar which is child safe.

A removable safety bar for a baby stroller includes a sturdy shaft fabricated of rigid plastic. Securably attached to each of both ends of the shaft is an engaging means. The end of the engaging means is integrally formed with an engaging piece which securely hooks over a rim of a flange formed on an inner wall of a hole formed in the arm of the baby stroller. The engaging means is further formed with an end block which securely abuts against the outer wall of the arm for protecting the child's fingers. Furthermore, the shaft is covered with a soft foam rubber sleeve which provides both a protective and decorative casing.

The engaging means, fabricated from a flexible plastic, is designed to easily disengage from the flange by a slight pressure applied with the fingers. The engaging means is then slid back along the shaft until completely removed from within the arm. A spring provided within the engaging means provides a restorative force which causes the engaging means to slide back to its original position upon removal from the arm.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
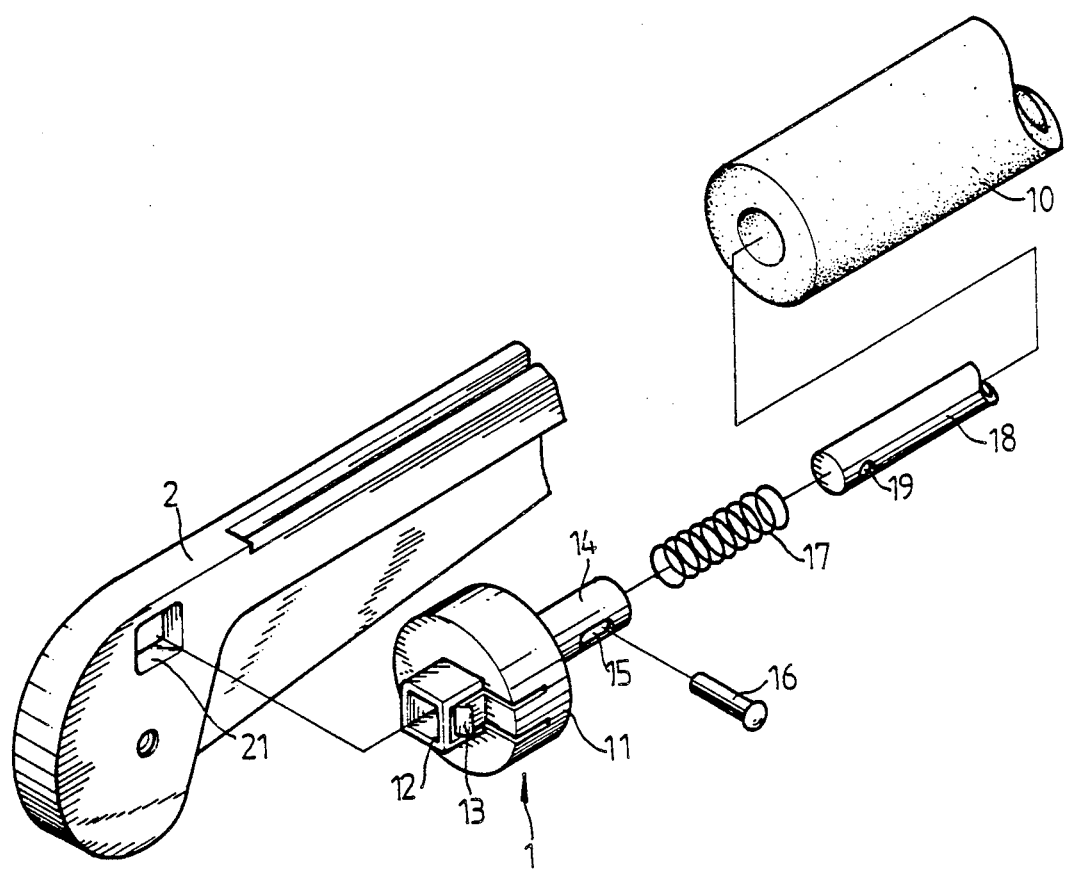
FIG. 1 is an exploded view of a removable safety bar for a baby stroller in accordance with the present invention.

With reference to the drawings and intially to FIG. 1, either end of a removable safety bar for a baby stroller is installable in each respective arm 2 of a baby stroller by means of an engaging means 1. Although only one end of the safety bar with corresponding engaging means 1 and one arm 2 are shown in the figures for simplicity, it is to be understood that the drawings of the figures are representative of either of both ends of the safety bar with corresponding engaging means 1 and either of both arms 2 a baby stroller. As is best shown in FIGS. 2 and 3 each of both hollow arms 2 is formed with an essentially square hole with an inner flange 21.

With reference again to FIG. 1, the engaging means 1 is formed with a square notch 12 which corresponds with an inner flange 21 formed in a hole in each arm 2. The notch 12 is integrally formed on one side thereof with an engaging tab 13 for securing an engagement of the notch 12 with the flange 21. Disposed directly behind the notch 12 on the safety bar 1 is and end block 11 which fits flushly against the side of the arm 2 when the safety bar 1 is installed in the baby stroller, Integrally formed with the hollow end block 11 is a tube 14 provided with a slot 15 through which a pin 16 is passable.

Each respective end of a shaft 18 is formed with a pin hole 19. Both of each ends of the shaft 18 fit into the tube 14 within which a spring 17 has been previously disposed. A connection therebetween is secured by the pin 16 which passes first through the slot 15 and then into the pin hole 19. When assembled the shaft 18 is covered by a foam rubber sleeve 10 for decoration and comfort.

Figure 2:
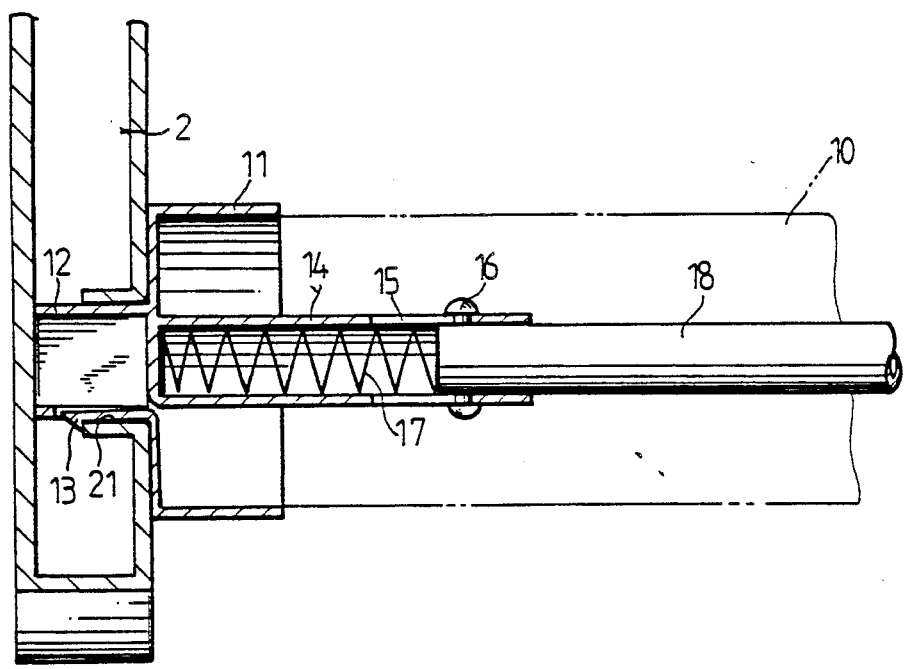
FIG. 2 is a top plane view of a removable safety bar for a baby stroller in accordance with the present invention installed in an arm of a baby stroller.
Figure 3:
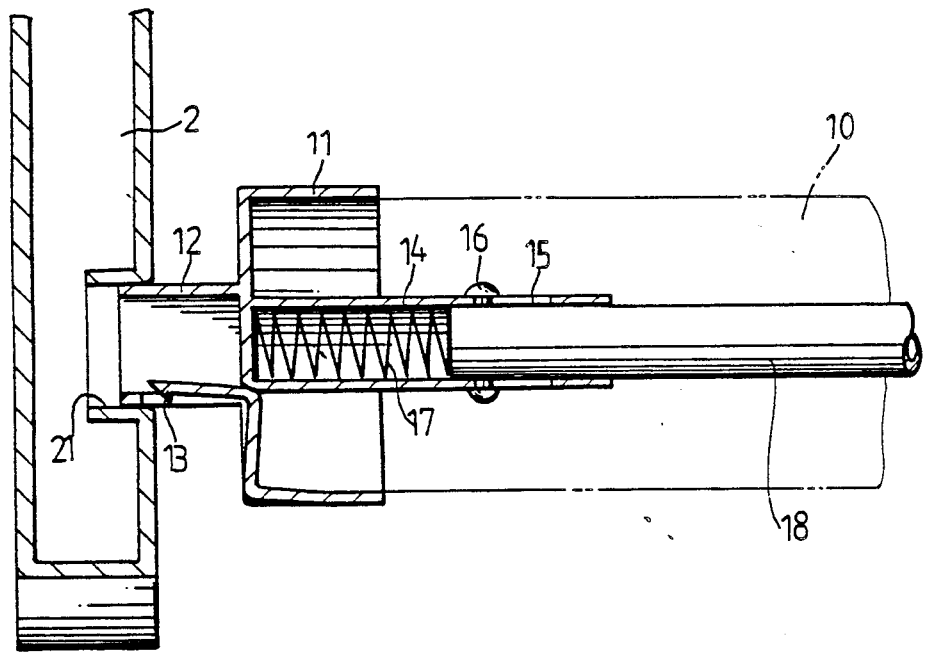
FIG. 3 is a top plane view of a removable safety bar for a baby stroller in accordance with the present invention partially disengaged from an arm of a baby stroller; and, FIG. 4 is a perspective view of a baby stroller with the installed removable safety bar of FIG. 1.

FIG. 2 shows in further detail the removable safety bar 1 installed in an arm 2 of a baby stroller. The square notch 12 locks securely into the arm 2 by means of the engaging piece 13 which hooks over the rim of the flange 21. The end block 11 securely abuts against the side of the arm 2. An end of the shaft 18 is secured within the tube 14 by the pin 16 which abuts against the back end of the slot 15 due to a force imposed by the spring 17. The foam rubber sleeve 10 drawn in ghost lines covers the tube 14 and shaft 18 so that the entire removable safety bar is of approximately the same diameter, i.e. the diameter of the end block 11.

FIG. 3 shows the ease with which the removable safety bar is disengaged from the arm 2 of a baby stroller. The flexible plastic from which the engaging means 1 is fabricated allows a user to disengage the engaging piece 13 from the flange 21 with a slight pressure applied by the fingers. The engaging means 1 is then slid back along the shaft 18 out of the arm 2 with the spring 17 compressing until the pin 16 abuts against the forward end of the slot 15. The sleeve 10 should therefore be formed of a flexible material so as to facilitate the removal of the engaging means 1 from the arm 2.

Figure 4:

A baby stroller with the installed removable safety bar of the present invention is shown in FIG. 4. The safety bar is easily removed before placing a child in the stroller for accomodating larger children or babies all bundled up during the colder months. The foam rubber sleeve 10 and end blocks 11 make the removable safety bar for a baby stroller of safe as well as handsome design.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A removable safety bar for the attachment to the arms of a baby stroller comprising a rigid shaft formed at each end thereof with a pin hole within which a pin is securably fixable;

an engaging means which is attachable to each of both ends of said rigid shaft, said engaging means comprising a tube portion for accepting an end of said rigid shaft, said tube being formed with a slot through which said pin is passable, a spring being disposed within said tube abutting against said end of said rigid shaft and said pin, said pin making contact with a forward end of said slot due to said spring, said engaging means being further formed with an engaging piece which securely hooks over the rim of a flange formed on the inner wall of an arm of the baby stroller, said engaging piece being unhookable from said flange by means of a slight pressure applied by a user's fingers, said engaging means being removable from said arm of the baby stroller by being slid back along said rigid shaft until said pin makes contact with the back end of said slot in said tube, said engaging means returning to an original position thereof by means of a restorative force applied by said spring.

* * * * *